Feb. 2, 1965

J. GREY 3,167,956

CALORIMETRIC PROBE

Filed March 12, 1963

COOLANT IN

COOLANT OUT

INVENTOR
JERRY GREY
BY Berry & Brews
ATTORNEY

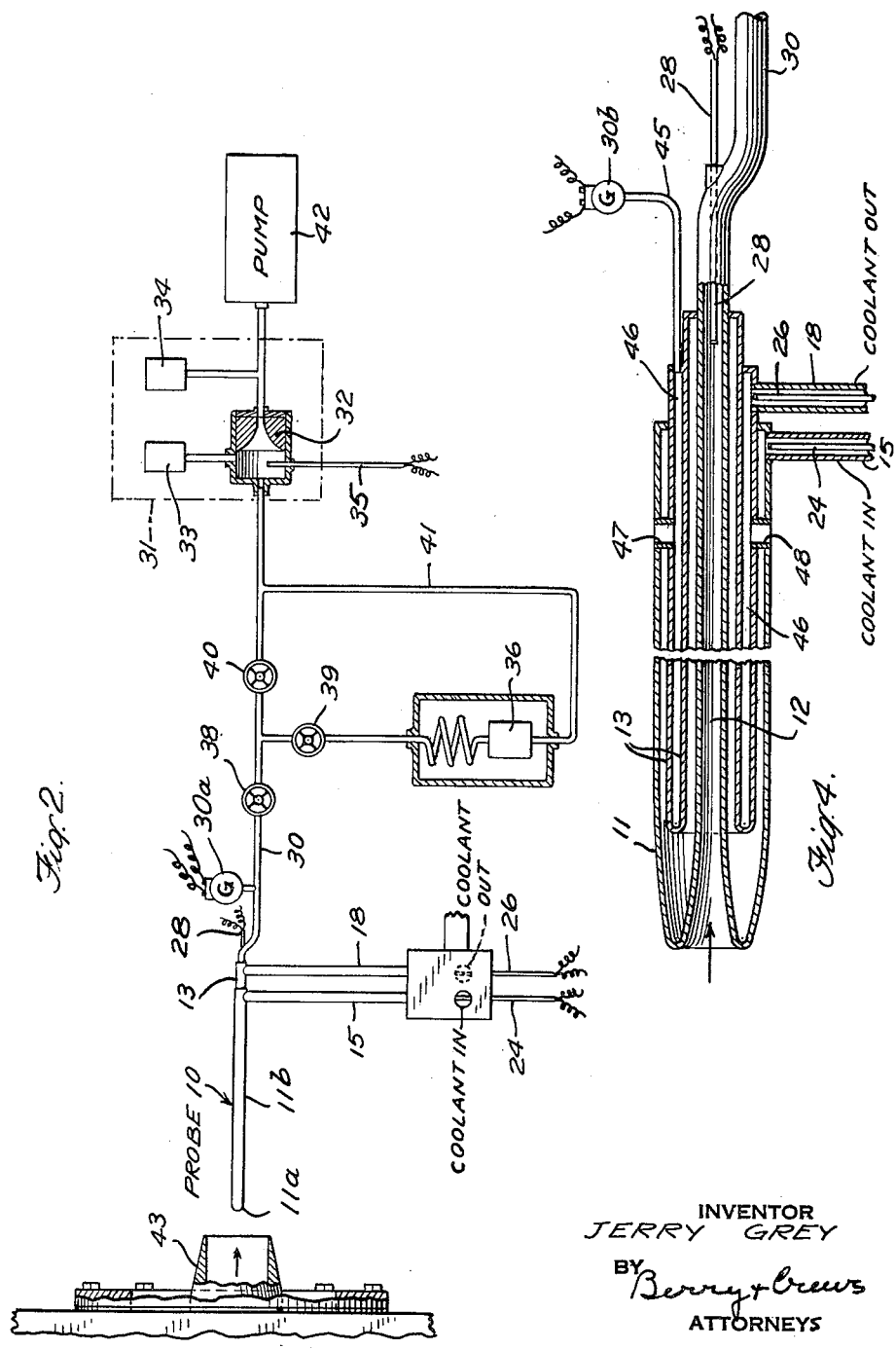

3,167,956
CALORIMETRIC PROBE
Jerry Grey, 61 Adams Drive, Princeton, N.J.
Filed Mar. 12, 1963, Ser. No. 264,525
7 Claims. (Cl. 73—190)

My present invention relates to a method and apparatus for measuring the properties of gases at high temperatures, particularly those in excess of 5,000° K.

The measurement of gas properties at temperatures above 5,000° K. has long been a serious problem. Devices which depend on solid-state properties, e.g., thermocouples or thermometers of any type, would be beyond their melting points. Simple optical techniques such as pyrometry or sodium "D"-line reversal are limited by source brightness temperatures. More advanced spectroscopic methods are not only quite delicate and elaborate, but are subject to a number of difficult-to-avoid errors, e.g., depth of field in sources having high gradients, pressure broadening effects, difficulty in isolating the appropriate temperature, etc. These errors generally result in experimental scatter on the order of 10 to 20%. Other temperature measurement techniques which depend on gas properties such as electrical conductivity, sound velocity, etc., are subject to numerous errors when applied to non-uniform regions and have been unable to provide better than 10% repeatability. (See C. G. Suits, "High Temperature Gas Measurements in Arcs," Symposium on Temperature—Its Measurement and Control in Science and Industry, Reinhold Publishing Corporation, New York, 1941, page 720.)

My improved method is characterized by passing a gas sample through a probe which is of such a nature as to function as a calorimeter, thereby obtaining a measure of the energy contained in the sample which, taken with other measurements of the flowing gas stream, result in data sufficient to yield various desired gas properties, including enthalpy, temperature, degree of ionization, degree of dissociation, total pressure, velocity, gas composition, etc. My improved method and apparatus are therefore suitable for obtaining such data from gases within or issuing from nuclear or chemical rocket engines, arc-jet or plasmajet engines, or any other hot-gas device. The flow may be subsonic, supersonic, or quiescent.

It is also a feature of my improved method to eliminate errors of calorimetry due to the exterior cooling required by the extremely high-temperature environment.

Other features of my invention, and objects to be attained, will be apparent from the following detailed description, and the features of novelty will be pointed out in the appended claims.

In the annexed drawings,

FIGURE 2 is a view of the system as a whole;

FIGURE 4 is a sectional view of a modified probe proper, showing means for measuring the static pressure of the probe environment in a region of nonuniform pressure.

Figures 1, 1A, 3:
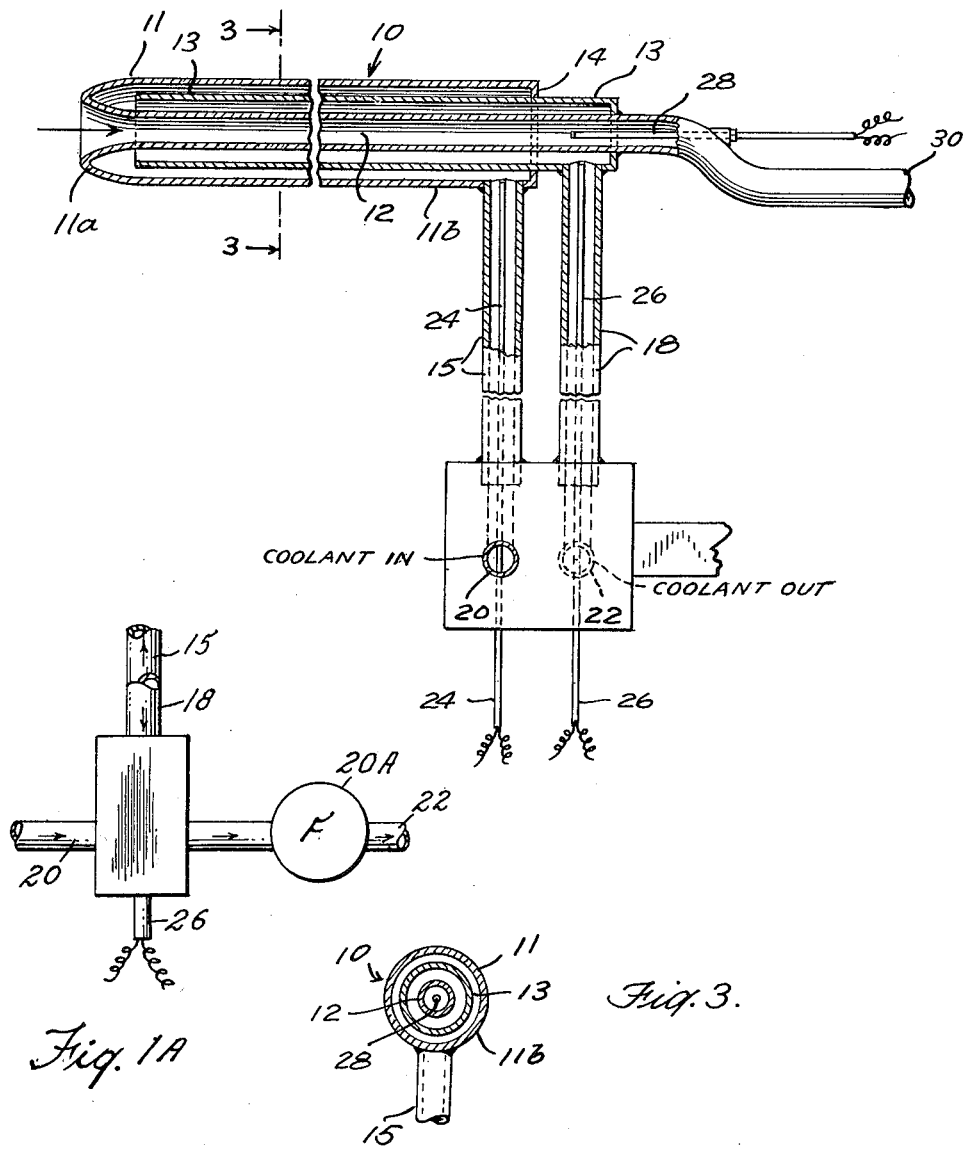
FIGURE 1 is a view of an illustrative embodiment of the probe proper in vertical section.
FIGURE 1A is a view of certain details of the pipe connections, as seen from the right of FIGURE 1.
FIGURE 3 is a section taken on line 3—3 of FIGURE 1.

Referring to FIGURE 1, 10 denotes the probe as a whole, which may consist of copper or stainless steel or other suitable metal, and may be straight as shown, or bent at an angle. It comprises a tube 11 of small diameter (perhaps one-eighth inch or smaller) having a tip 11a of annular cross-section which provides an internal passage 12. Within the annular space bounded by the tube 11, is a baffle 13 of cylindrical shape providing for circulation of the coolant and extending beyond the rear wall 14 of tube 11, but short of the front end, all as shown. The coolant, for example water, is introduced through pipe 15 communicating with the space bounded by outer wall 11b of the probe and baffle 13, flowing to the tip of the probe and then back in the space between the wall forming passage 12 and baffle 13. Coolant is admitted to the apparatus through pipe 20 having therein flowmeter 20a, and leaves through pipe 18 and connection 22, said connections being provided with valves, not shown, to regulate the flow. Four thermocouples are provided, one, 24 to measure the initial temperature of the coolant, one 26 to measure the exit temperature thereof, one, 28 to measure the exit temperature of the gas sample, and one 35 in the choked orifice 32, to be described.

In order that further data of the gas leaving the probe may be determined, the probe 10 is connected by tubing 30 having therein pressure gauge 30a, in which it is passed to devices for measuring mass flow of the gas, its total pressure, and its chemical composition, if necessary. Devices employed by me for these measurements are a flowmeter 31 which may consist of a choked orifice 32 and manometers 33, 34 together with thermocouple 35, for mass flow determination, and either a simple thermal conductivity cell or a gas chromatograph 36 for the composition measurement, also as described below, such cell being capable of being cut in and out of the system by means of valves 39 and 40, together with pipe 41. A vacuum pump 42 of any suitable design is used to draw the flow through the system if needed.

As shown, the probe and the auxiliary devices may be mounted in the proximity of a source of hot gas whose properties are to be determined. In one such use, a stream of hot gas heated in an electric arc (not shown) issues from nozzle 43.

Having described the improved apparatus, the new method may now be described in general terms followed by a specific example of the measurement of the properties of argon at high temperatures. First the coolant water flow is turned on, and remains flowing for the entire test period. The probe 10 is then inserted into the hot gas source to be measured, with the probe tip 11a at the desired measurement location. The valve 38 remains closed so that no gas flows through the tube. The coolant, which may be water at 500 p.s.i., is allowed to circulate while readings are taken from the thermocouples 24 and 26, and also of the coolant flow rate by means of flowmeter 20a. At this time a reading of the total pressure is also taken from gauge or transducer 30a. The valves 38 and 40 are then opened, valve 39 being closed, and with the vacuum pump 42 operating, gas is drawn through the internal passage 12, and thence the tube 30. The thermocouple readings 24 and 26 and coolant flow rate are again taken, together with additional measurements of thermocouple 28 and gas flowmeter 31. If needed, gas composition may now also be observed with the chromatograph 36 (closing valve 40 and opening valve 39) in the manner as set forth in book by E. Heftman, "Chromatography," Reinhold Publishing Corporation, N.Y., 1961.

The total pressure measurement may be used to determine gas velocity by conventional pitot-static probe theory as set forth in the article "Methods of Flow Measurement," by Grey, J., and Liu, F. F., Journal American Rocket Society, 23, No. 3, May-June 1953, page 133 (or any standard text on aerodynamics). Determination of the gas enthalpy may now also be obtained from the measurements, as will be evident from the specific example post.

The coolant flow rate and thermocouple 24 and 26 readings taken when the valve 38 has been closed, are used as a "tare" measurement. The same readings taken with valves 38 and 40 open, when the "tare" value is subtracted as described below, provide the amount of energy extracted from the gas sample flow through passage 12 by the coolant. This rate of heat removal from the gas sample is then given by the difference between the two coolant rates:

$$w_g(h_{1g}-c_{p_g}T_{2g})=(w_c c_{p_c}\Delta T_c)_{\text{flow}}-(w_c c_{p_c}\Delta T_c)_{\text{no flow}} \quad (1)$$

where $w_g$ = gas sample mass flow rate as measured by flowmeter 31
$w_c$ = coolant water mass flow rate as measured by any standard liquid flowmeter
$h_{1g}$ = unknown gas enthalpy at probe entrance
$c_{p_c}$ = coolant specific heat
$\Delta T_c$ = coolant temperature rise = $(T_c)$out−$(T_c)$in, as measured by thermocouples 24 and 26
$T_{2g}$ = gas temperature of cooled gas at probe exit 14, as measured by thermocouple 28
$c_{p_g}$ = specific heat of cooled gas at probe exit 14, obtained from gas composition which is either known (e.g., pure argon) or measured by chromatograph 36.

The parenthesis ( )$_{\text{flow}}$ refers to the case in which valve 38 is open, and gas flows (either through valve 39 or 40). The parenthesis ( )$_{\text{no flow}}$ refers to the case in which valve 38 is closed, and a gas sample therefore does not flow.

It is therefore evident that the unknown gas enthalpy $h_{1g}$ may now be calculated by operation of Equation 1 above, i.e., $$h_{1g}=c_{p_{1g}}T_{2g}+\frac{(w_c c_{p_c}\Delta T_c)_{\text{flow}}-(w_c c_{p_c}\Delta T_c)_{\text{no flow}}}{w_g} \quad (2)$$

Where the temperature of the gas is desired, it may be obtained by use of the following equation:

$$h_{1g}=\overline{C}_{p_{1g}}T_{1g}+Q_1\alpha_{1g}+Q_2\delta_{1g} \quad (3)$$

where $h_{1g}$ is the specific enthalpy measured as described above, $\overline{C}_{p_{1g}}$ is the mean specific heat at constant pressure of the "frozen" gas mixture, $T_{1g}$ is the unknown temperature, $Q_1$ is the ionization energy per unit mass, $Q_2$ the dissociation energy per unit mass, $\alpha_{1g}$ is the fraction of gas which is ionized, $\delta_{1g}$ the fraction dissociated. If a relation between $\alpha_{1g}$, $\delta_{1g}$, and temperature $T_{1g}$ may be assumed, e.g., as is given by the assumption of equilibrium, as discussed in E. H. Kennard, "Kinetic Theory of Gases," McGraw-Hill, 1938, pp. 426, 427, then such a relation gives, at any fixed pressure level $$Q_1\alpha_{1g}+Q_2\delta_{1g}=\epsilon(T_{1g}) \quad (4)$$

Thus $$h_{1g}=\overline{C}_{p_{1g}}T_{1g}+\epsilon(T_{1g}) \quad (5)$$

and hence the temperature $T_{1g}$ may be deduced from the enthalpy $h_{1g}$ as described above, needing only a value for $\overline{C}_{p_{1g}}$, which is known for any gas of known composition.

The following example of the calculation of gas properties is now given.

Let it be desired to measure the flow characteristics of a hot gas stream of argon, as illustrated in FIGURE 2. The desired flow characteristics are, gas enthalpy, velocity, temperature and degree of ionization.

Consider first the flow of a chemically pure gas; e.g., argon issuing into a tank held at a constant ambient pressure $P$=14.70 p.s.i.a., with the probe tip 11$a$ at the desired location within the hot argon stream issuing from nozzle 43, and water flowing through the probe jacket via tubes 15 and 18. The valve 38 is closed, shutting off the gas sample flow through the probe. Observations of the coolant water-flow rate and temperature rise are now made, with the following values:

Coolant rate $W_c$=0.0405 lb./sec.
Coolant temperature rise (thermocouple 24 reading minus thermocouple 26 reading)

$$\Delta T_c=65° \text{ F.}$$

With the valve 38 still closed, the total pressure at the probe tip 11$a$ is now observed on the gauge 30$a$, e.g., $$P_0=14.92 \text{ p.s.i.a.}$$

The valves 38 and 40 are now opened and the vacuum pump 42 turned on. Gas flows through the tubes 12 and 30, passing through flowmeter 31. The following readings were taken:

$$w_c=0.0410 \text{ lb/sec.}$$

$$\Delta T_c=74° \text{ F.}$$

The thermocouple 28 reading is now taken:

$$T_{2g}=360° \text{ F.}=820° \text{ R.}$$

The choked orifice diameter is .030″, and the manometer readings as follows:
Manometer 33: 9.5″ Hg abs.
Manometer 34: 2.4″ Hg abs.
The temperature as observed by thermocouple 35 is 70° F.

The latter four readings, together with the knowledge that the gas is argon, provide a value for the gas flow rate (Ref. Shapiro, A.H., "Dynamics and Thermodynamics of Compressible Fluid Flow," vol. 1, Ronald Press, 1953, Chapter 4) as long as the ratio of absolute pressures measured by manometers 33 and 34 respectively is less than $$\frac{P^*}{P_0}=\left(\frac{2}{\gamma+1}\right)^{\frac{\gamma}{\gamma+1}} \text{(critical condition for choking)} \quad (6)$$

where $\gamma$ = specific heat ratio of gas (=1.67 for argon).

$$\frac{P^*}{P_0}=\left(\frac{2}{2.67}\right)^{\frac{1.67}{.67}}=0.75^{2.5}=0.486 \quad (7)$$

whereas the measured ratio is only $$\frac{2.4}{9.5}=0.253$$

Thus the orifice 2 is truly choked, and the mass flow rate is given directly (Eq. 4.17 of Shapiro):

$$w_g=A\sqrt{\frac{\gamma g_0}{R}\left(\frac{2}{\gamma+1}\right)^{\frac{\gamma+1}{\gamma-1}}}\frac{(\text{Press. at Manometer 45})}{\sqrt{\text{Temp. at thermocouple 48}}} \quad (8)$$

Where $A$ = orifice throat area = $\frac{\pi(.030)^2}{4}$ = 0.000707 in.$^2$ $R$ = gas constant = 39.7 $\frac{\text{ft.-lb.}}{\text{lb.-° F.}}$ for argon $g_0$ = 32.2 ft./sec.$^2$ Then $$w_g=(.000707)\sqrt{\frac{(1.67)(32.2)}{(39.7)}\left(\frac{2}{2.67}\right)^{\frac{2.67}{.67}}}\frac{\left[(9.5\times.491)\frac{\text{lb.}}{\text{in.}^2}\right]}{\sqrt{530° R.}}$$

$$=9.35\times 10^{-5} \text{ lb./sec.}$$

Finally, knowing the gas to be argon, its specific heat $c_{p_{1g}}$ is approximately 0.12 B.t.u./lb.-° F. at 360° F. Using the above stated calorimeter Equation 2, therefore, $$h_{1g} = (0.124)(820) + \frac{(0.0410)(74) - (.0405)(1)(65)}{9.35 \times 10^{-5}}$$

$$= 102 + \frac{(3.05 - 2.63)}{9.35 \times 10^{-5}}$$

$$h_{1g} = 102 + 4500 = 4602 \text{ Btu./lb.}$$

To deduce from this the temperature $T_{1g}$ and degree of ionization $\alpha_{1g}$ (or dissociation $\delta_{1g}$), it is necessary to assume that the gas is at or near equilibrium (or, alternatively, to provide any equation which relates temperature and pressure to enthalpy). For the case of argon at or near equilibrium at a pressure P of 14.70 p.s.i.a. and an enthalpy of 4602 B.t.u./lb., the equation of state provides (e.g., see Cann, G. L., and Ducata, A. C., "Argon Mollier Chart," Office of Scientific Research, USAF, Contract No. AF 49(638)-54, February 1959), $$T_{1g} = 21,500° \text{ R.}$$

$$\alpha_{1g} = 0.112$$

Knowing now the temperature, pressure and ionized fraction, the density $\rho_{1g}$ may be obtained from the 2-component ideal-gas equation of state:

$$\rho_{1g} = \frac{P}{(1+\alpha_{1g})RT_{1g}} \quad (10)$$

where the factor $(1+\alpha_{1g})$ accounts for the presence of electrons.

Thus $$\rho_{1g} = \frac{(14.70)(144)}{(1+.112)(39.7)(21,500)} = 0.00221 \text{ lb./ft.}^3$$

and the gas velocity $V_{1g}$ may now be computed from the pitot-tube formula $$V_{1g} = \sqrt{\frac{2(P_0 - P)g_0}{\rho_{1g}}}$$

$$= \sqrt{\frac{2(14.92 - 14.70)(144)(32.2)}{0.00221}} = 801 \text{ ft./sec.} \quad (11)$$

Now, if a two-component (or multicomponent) gas is used, the thermal conductivity cell or chromatograph 36 is used to measure the chemical composition in accordance with the standard method described in the Heftman reference. This is then used to determine gas specific heats and density by standard partial-pressure (Dalton) theory as per any standard text on thermodynamics, and the balance of the calculation is identical to the above. Thus the gas mixture whose composition is to be determined is passed through a chromatograph column filled with a finely divided material capable of adsorbing gases (e.g., powdered inulin or precipitated chalk). In one embodiment, the adsorbed (unknown) gas is then displaced by introducing a known, more readily adsorbed gas into the column. The constituents of the unknown gas are thus displaced and emerge in order of increasing molecular weight (decreasing vapor pressure). These constituents, now separated in time, pass directly to a thermal conductivity measurement cell for identification. Plotting the electrical output of the thermal conductivity cell vs. time, one therefore may identify each constituent from the measured value of thermal conductivity (see below), and the fraction of that constituent from the time interval during which it emerges from the column.

In the operation of the thermal conductivity measurement cell, a wire immersed in the unknown gas is heated continuously by a fixed electric current, and its change in resistance due to heat loss to the gas is measured by a conventional bridge circuit. This heat loss depends directly on the thermal conductivity of the gas, and all gases have different thermal conductivities. The test gas is maintained at a known temperature (e.g., by an oil bath heat exchanger), and prior calibration with known gases (e.g., gas thermal conductivity vs. bridge output voltage) then permits the thermal conductivity of any unknown gas to be determined at the known temperature. Consultation with known, tabulated values of gas thermal conductivities (e.g., Handbook of Physics and Chemistry, Chemical Rubber Publishing Co.) then permits identification of the unknown gas.

If desired, a plurality of measurements of the gas may be made by disposing the probe in a plurality of positions along a radius or diameter of the total gas flow and an average taken of the measurement so obtained.

Reference to FIGURE 4 shows a modification of the probe which is useful where the pressure of the ambient gas differs from that of the atmosphere, or is variable, as could be the case, say in a rocket nozzle. In this embodiment means are provided for recording the local static pressure by means of gauge 30b at the end of the tube 45. The latter leads into a space 46 formed by making the wall of baffle 13, FIGURE 1, double, and providing nipples 47, 48 which afford communication from said space 46 to the exterior of the tube 11. In use, the probe is inserted into the body of the gas whose properties are to be ascertained, with the tube 11 approximately parallel to the direction of the gas velocity, whereby the pressure gauge 30b registers the local static pressure therein.

It will be understood that my improved method and apparatus are applicable to the measurement of a steady state of the gas rather than to the measurement of transient states. When used to measure the steady state, temperatures as high as 15,000° K. have been measured with an average accuracy of ½% and a statistical standard deviation of 3%.

It will be further understood that the improved method may be carried out by means of apparatus other than that specifically disclosed.

I claim:
1. The method of measuring properties of high temperature gases which consists in
    passing a sample of said gas through a tube-type probe which is relatively long in relation to its internal diameter,
    abstracting a measured quantity of heat from said gas by passing a coolant in heat exchange relation therewith,
    measuring the mass flow of the gas,
    measuring the temperature of the gas upon abstraction of heat therefrom by said coolant,
    measuring the heat loss occurring when a measured quantity of said coolant is passed in heat exchange relation with said probe when said gas is not flowing,
    recording the data so measured from which the enthalpy of the hot gas and other desired properties may be computed.
2. The method according to claim 1, including the step of continuously measuring the composition of the gas and its total pressure.
3. In a high temperature gas probe, a conduit adapted to conduct a stream of the gas whose properties are to be measured, a
    heat absorbing jacket surrounding said conduit,
    means for circulating a measured quantity of coolant fluid through said jacket
    means for measuring the rise in temperature of the collant irrespective of gas flow,
    means for measuring the mass flow of said gas, said means last mentioned also indicating zero flow of said gas when said flow is shut off, and
    means for measuring the temperature of the flowing gas exiting from said conduit.
4. The high temperature probe according to claim 3 including a device for continuously measuring the composition of the gas, and a device for measuring its total pressure.
5. The high temperature probe according to claim 3 including a device for continuously measuring the com- position of the gas, together with means for measuring the local static pressure of said gas when said static pressure is not constant.

6. The high temperature probe according to claim 3 which includes
means for determining the local static pressure of the gas, such means comprising
a hollow baffle which extends into said probe proper to provide the circulation of coolant therethrough,
means providing communication between the interior of said baffle and the atmosphere surrounding said probe proper, and
a conduit leading from the interior of said baffle to a pressure registering device.

7. The high temperature probe according to claim 3 including
a main conduit leading from the probe proper to the means for measuring the mass flow of the gas,
a branch conduit leading off from said main conduit between said probe proper and said mass flow measuring device in said branch conduit for continuously measuring the composition of the gas, and
valve means for cutting in or cutting out at will said device.

References Cited by the Examiner

UNITED STATES PATENTS 2,691,890   10/54   Moore et al. _____ 73—425.4 X

FOREIGN PATENTS 795,238   5/58   Great Britain.

OTHER REFERENCES

Pages 17 to 24, November 1951, Fowler, Instrument Practice.

RICHARD C. QUEISSER, *Primary Examiner*.
JOSEPH P. STRIZAK, *Examiner*.